(12) United States Patent
Senoh

(10) Patent No.: US 6,240,121 B1
(45) Date of Patent: May 29, 2001

(54) APPARATUS AND METHOD FOR WATERMARK DATA INSERTION AND APPARATUS AND METHOD FOR WATERMARK DATA DETECTION

(75) Inventor: Takanori Senoh, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/112,388

(22) Filed: Jul. 9, 1998

(30) Foreign Application Priority Data

Jul. 9, 1997 (JP) .................................... 9-183429

(51) Int. Cl.$^7$ ............................................. H04N 7/08
(52) U.S. Cl. ............................ 375/130; 380/4; 382/248
(58) Field of Search ............................. 375/130, 140, 375/142, 147, 150; 380/4, 5; 382/248, 250

(56) References Cited

U.S. PATENT DOCUMENTS

| | | | |
|---|---|---|---|
| 5,319,735 | * 6/1994 | Preuss et al. | 704/205 |
| 5,734,752 | 3/1998 | Knox . | |
| 5,809,139 | * 9/1998 | Girod et al. | 380/202 |
| 5,848,155 | * 12/1998 | Cox | 382/191 |
| 5,915,027 | * 6/1999 | Cox et al. | 380/54 |
| 5,930,369 | * 7/1999 | Cox et al. | 380/54 |
| 6,061,793 | * 5/2000 | Tewlik et al. | 713/176 |
| 6,069,914 | * 5/2000 | Cox | 375/150 |
| 6,154,571 | * 11/2000 | Cox et al. | 382/250 |

FOREIGN PATENT DOCUMENTS

| | | |
|---|---|---|
| 0 766 468 | 4/1997 | (EP) . |
| 2 740 897 | 5/1997 | (FR) . |
| 4-349488 | 12/1992 | (JP) . |
| WO 97/26733 | 7/1997 | (WO) . |

OTHER PUBLICATIONS

J. Onishi et al., "A watermarking scheme to image data by PN sequence", SCIS'97, 26B, pp. 1–8, 1997 (with English abstract).

European Search Report dated Jun. 7, 1999 for EP 98112561.

W. Bender et al., "Techniques for Data Hiding", IBM Systems Journal, vol. 35, Nos. 3 & 4, pp. 313–335, 1996.

* cited by examiner

*Primary Examiner*—Young T. Tse
(74) *Attorney, Agent, or Firm*—Ratner & Prestia

(57) ABSTRACT

A watermark data insertion method for inserting watermark data into an input original signal is provided. The method includes: a frequency transform step for applying a frequency transform to the original signal to form an intermediate signal; a watermark data insertion step for inserting the watermark data into a first set of frequency component of the intermediate signal; and a frequency inverse transform step for applying an inverse frequency transform to the intermediate signal, the watermark data having been inserted into the intermediate signal, thereby obtaining a signal containing the watermark data embedded therein. The watermark data insertion step includes: determining, based on pseudo random numbers, the first set of frequency components of the intermediate signal into which the watermark data is inserted; and using a second set of frequency components of the intermediate signal as a reference signal, the watermark data not being inserted into the second set of frequency components.

7 Claims, 6 Drawing Sheets

APPARATUS AND METHOD FOR WATERMARK DATA INSERTION AND APPARATUS AND METHOD FOR WATERMARK DATA DETECTION

BACKGROUND OF THE INVENTION

1. Field of the Invention

The present invention relates to a watermark data insertion method for inserting watermark data into a digitalized signal representing images, sounds, and/or the like to indicate their copyrights, and a watermark data detection method for detecting inserted watermark data.

2. Description of the Related Art

Techniques for inserting watermark data into a digitalized signal representing images, sounds, and/or the like to indicate their copyrights having been vigorously studied and developed. Such watermark data is required to have minimum interference with the images and/or sounds of interest, be hardly visible (in the case of image data) and hardly audible (in the case of sound data), and yet be easily detected by a person knowing the detection method while preventing unauthorized removal of the watermark data by third parties. By using such watermark data, for example, infringement of a copyright (by illegal copying of images and/or sounds) by unauthorized third parties can be established or prevented.

One conventional method for inserting watermark data into an original signal representing images, sounds, and/or the like utilizes a spread spectrum technology. In principle, this method involves: multiplying the original signal representing images, sounds, and/or the like by random numbers to obtain a uniform spectrum; adding watermark data to the multiplied signal; and again multiplying the resultant signal with the same random numbers to restore the original signal. At the time of restoring the original signal, the added watermark data is also multiplied by the random numbers. As a result, the watermark data has a uniformly spread spectrum, i.e. becomes white noise, in the restored original signal.

FIG. 7 is a block diagram illustrating the structure of a conventional watermark data insertion apparatus utilizing a spread spectrum technology. As shown in FIG. 7, an original signal a1 (into which watermark data $x_i$ is to be inserted) is input to a multiplier 52, where it is multiplied by predetermined pseudo random numbers to become $a_i \times c_i$. Since the pseudo random numbers $c_i$ are a random sequence of +1 and −1, the frequency spectrum of $a_i \times c_i$ becomes uniform.

Next, the watermark data $x_i$ is input to an adder 53 to be added to a DC component of the above multiplication product $a_i \times c_i$. Although not shown, the adder 53 includes a cascade connection of a Fourier transformer, an adder, and an inverse Fourier transformer for extracting a DC component of an input signal.

The signal $a_i \times c_i + x_i$ (i.e., the randomized original signal plus the watermark data) is input to a multiplier 54, where it is again multiplied by the same pseudo random numbers to give $a_i \times c_i^2 + x_i \times c_i$. Since the pseudo random numbers are +1 or −1, $c_i^2$ equals 1. Therefore, a signal having a value of $a_i + x_i \times c_i$ ($= a_i \times c_i^2 + X_i \times c_i$) is obtained, i.e., a signal with embedded watermark data.

FIG. 8 is a block diagram illustrating the structure of a conventional watermark data detection apparatus utilizing a spread spectrum technology for detecting embedded watermark data. As shown in FIG. 8, a signal with embedded watermark data $a_i + x_i \times c_i$ is input to a multiplier 62, where it is multiplied by predetermined pseudo random numbers to become $a_i \times c_i + x_i \times c_i^2 = a_i \times c_i + x_i$. Since the pseudo random numbers ci are a uniform random sequence of +1 and −1, the DC component of $a_i \times c_i$ becomes zero, so that only the watermark data $x_i$ is extracted by an extractor 63. The extractor 63 includes a Fourier transformer for extracting a DC component of an input signal.

The above-described technique is reported in "Watermark data signature method for images utilizing PN series", Electronic Information Communication Society, "Encryption and Information Security Symposium" proceedings, SCIS '97-26B, 1997.

However, the above-described conventional technique has a disadvantage in that the watermark data may become noticeable where the original signal has a small amplitude because the watermark data is inserted into the original signal in a uniform manner, i.e., regardless of the characteristics of the original signal. There is also a disadvantage in that, if the amplitude of the watermark data is decreased in order to prevent the watermark data from becoming noticeable, the watermark data may be masked by the original signal and therefore difficult to detect. Furthermore, unauthorized third parties can make the watermark data impossible to detect by intentionally adding noise or the like to the original signal.

SUMMARY OF THE INVENTION

A watermark data insertion method for inserting watermark data into an input original signal according to the present invention includes: a frequency transform step for applying a frequency transform to the original signal to form an intermediate signal; a watermark data insertion step for inserting the watermark data into a first set of frequency components of the intermediate signal; and a frequency inverse transform step for applying an inverse frequency transform to the intermediate signal, the watermark data having been inserted into the intermediate signal, thereby obtaining a signal containing the watermark data embedded therein, wherein the watermark data insertion step includes: determining, based on pseudo random numbers, the first set of frequency components of the intermediate signal into which the watermark data is inserted; and using a second set of frequency components of the intermediate signal as a reference signal, the watermark data not being inserted into the second set of frequency components.

In one embodiment of the invention, the frequency transform applied in the frequency transform step is a wavelet transform, and the inverse frequency transform applied in the frequency inverse transform step is an inverse wavelet transform.

In another embodiment of the invention, the watermark data insertion step includes: a weighting step for increasing or decreasing a signal amplitude of the watermark data in accordance with an amplitude of the first set of frequency components of the intermediate signal into which the watermark data is inserted.

In still another embodiment of the invention, the watermark data insertion step includes determining the first set of frequency components of the intermediate signal into which the watermark data is inserted by using pseudo random numbers having frequency-dependent weights.

In still another embodiment of the invention, the watermark data insertion step includes: a weighting step for increasing or decreasing a signal amplitude of the watermark data in accordance with a frequency of the first set of frequency components of the intermediate signal into which the watermark data is inserted.

In still another embodiment of the invention, the watermark data insertion step includes converting binary data representing the watermark data into predetermined positive and negative values, and thereafter inserting the converted binary data into the first set of frequency components of the intermediate signal.

Alternatively, the watermark data insertion method for inserting watermark data into an input original signal according to the present invention includes: determining a position at which the watermark data is to be inserted in accordance with pseudo random numbers which have been subjected to an inverse transform; subjecting the watermark data to an inverse transform; increasing or decreasing a signal amplitude of the inverse-transformed watermark data in accordance with an amplitude of the original signal; and inserting the inverse-transformed watermark data with the increased or decreased signal amplitude into the original signal.

A watermark data detection method for detecting watermark data within a signal containing embedded watermark data according to the present invention includes: an inverse-transformed pseudo random number generation step for applying an inverse frequency transform to pseudo random numbers used for determining an insertion position of the watermark data and complements of the pseudo random numbers, respectively; a multiplication step for multiplying the signal containing embedded watermark data by the values generated in the inverse-transformed pseudo random number generation step to obtain signal components to which the watermark data has been added and signal components to which the watermark data has not been added; and an averaging step for deriving a difference between an average of the signal components to which the watermark data has been added and an average of the signal components to which the watermark data has not been added as obtained in the multiplication step, whereby the difference is detected as the watermark data.

In one embodiment of the invention, the averaging step includes deriving the average of the signal components to which the watermark data has been added by applying a weight to an average of high frequency components among the signal components to which the watermark data has been added, the weight being smaller than weights applied to averages of frequency components other than the high frequency components.

Alternatively, the watermark data detection method for detecting watermark data within a signal containing embedded watermark data according to the present invention includes: a frequency transform step for applying a frequency transform to the signal containing embedded watermark data to form an intermediate signal; and a watermark data extraction step for extracting the watermark data from a predetermined frequency component of the intermediate signal.

In one embodiment of the invention, the watermark data extraction step includes determining the predetermined frequency component of the intermediate signal from which the watermark data is extracted based on pseudo random numbers.

A watermark data insertion apparatus for inserting watermark data into an input original signal according to the present invention includes: a frequency transform section for applying a frequency transform to the original signal to form an intermediate signal; a watermark data insertion section for inserting the watermark data into a first set of frequency components of the intermediate signal; and a frequency inverse transform section for applying an inverse frequency transform to the intermediate signal, the watermark data having been inserted into the intermediate signal, thereby obtaining a signal containing the watermark data embedded therein, wherein the watermark data insertion section determines the first set of frequency components of the intermediate signal into which the watermark data is inserted based on pseudo random numbers, and uses a second set of frequency components of the intermediate signal as a reference signal, the watermark data not being inserted into the second set of frequency components.

A watermark data detection apparatus for detecting watermark data within a signal containing embedded watermark data includes: an inverse-transformed pseudo random number generation section for applying an inverse frequency transform to pseudo random numbers used for determining an insertion position of the watermark data and complements of the pseudo random numbers, respectively; a multiplication section for multiplying the signal containing embedded watermark data by the values generated in the inverse-transformed pseudo random number generation section to obtain signal components to which the watermark data has been added and signal components to which the watermark data has not been added; and an averaging section for deriving a difference between an average of the signal components to which the watermark data has been added and an average of the signal components to which the watermark data has not been added as obtained by the multiplication section, whereby the difference is detected as the watermark data.

In accordance with the above-described methods and apparatuses of the present invention, the insertion position and the signal amplitude of watermark data are varied in accordance with the frequency components and amplitude of an original signal, thereby making it difficult to detect the watermark data. This makes possible the insertion of watermark data that has a large amplitude, thereby preventing the destruction of watermark data by an intentional addition of noise or the like. Since the insertion position of the watermark data is determined by utilizing pseudo random numbers, those who do not know the insertion position cannot read the watermark data, thereby preventing unauthorized tampering with the watermark data. Furthermore, the random numbers used for determining the insertion position of the watermark data are visually weighted so as to render the perception of the watermark data even more difficult.

Thus, the invention described herein makes possible the advantage of providing a watermark data insertion method and a watermark data detection method for inserting watermark data in such a manner that the watermark data cannot be easily detected and yet imposes minimum interference with an original signal, such that the watermark data is hardly visible and/or audible and difficult to remove by unauthorized means and yet easily detectable through an authorized or intended procedure.

This and other advantages of the present invention will become apparent to those skilled in the art upon reading and understanding the following detailed description with reference to the accompanying figures.

DESCRIPTION OF THE PREFERRED EMBODIMENTS

Figure 1:
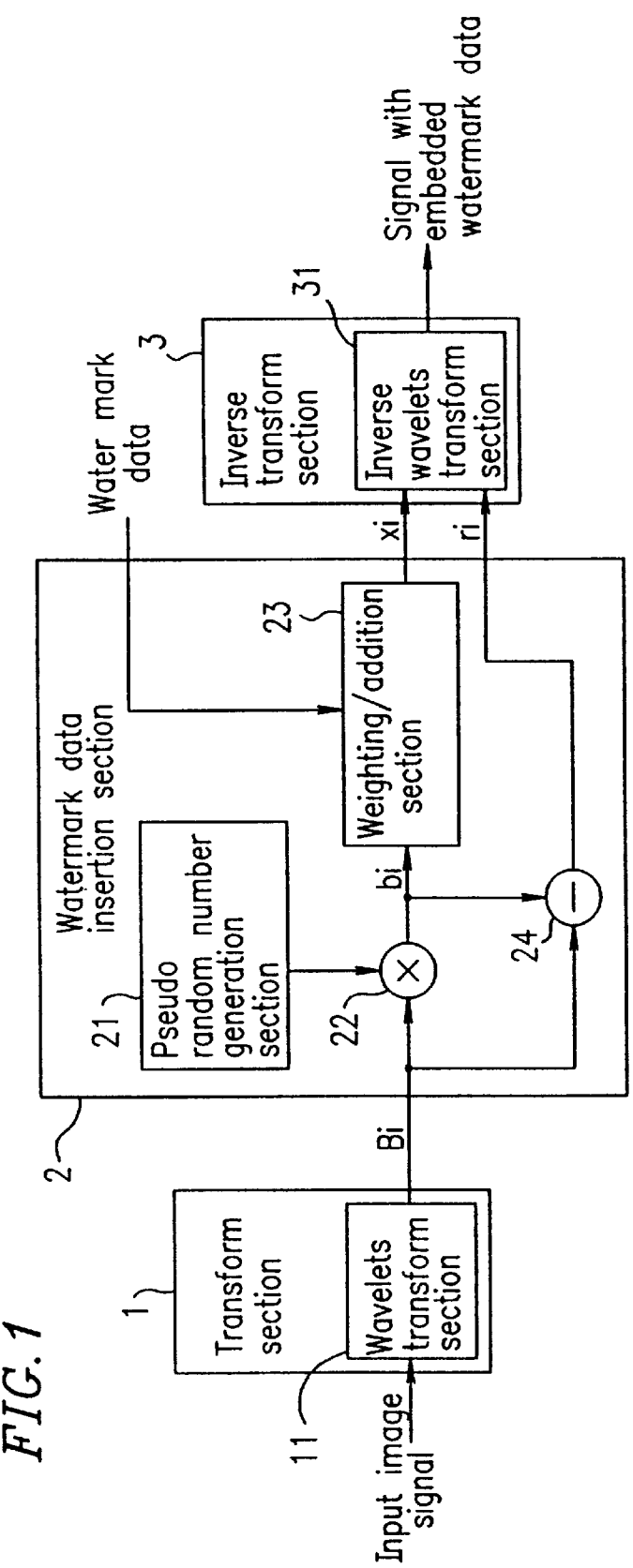
FIG. 1 is a block diagram illustrating the structure of a watermark data insertion apparatus according to one embodiment of the watermark data insertion method of the present invention.

Hereinafter, an example of the watermark data insertion method according to the present invention will be described with reference to the accompanying figures. FIG. 1 is a block diagram illustrating the structure of a watermark data insertion apparatus according to one embodiment of the watermark data insertion method of the present invention. The watermark data insertion apparatus includes a transform section 1, a watermark data insertion section 2, and an inverse transform section 3.

The transform section 1, which is mainly composed of a wavelet transform section 11 in the illustrated embodiment, breaks down an input image signal into two-dimensional frequency components. The wavelet transform section 11 includes a pair of filters, i.e., a high-pass filter and a low-pass filter (not shown), for separating an image signal into a high frequency component and a low frequency component, respectively. By repetitively passing the resultant high and low components through the same pair of filters, the wavelet transform section 11 breaks down the image signal into a large number of two-dimensional frequency components. A simplest wavelet transform section can be implemented by using a low-pass filter having multiplication coefficients (½, ½) and a high-pass filter having multiplication coefficients (½, -½) and discarding every other sample signal of the low frequency components and the high frequency components which passed through the respective filters.

Figure 2:
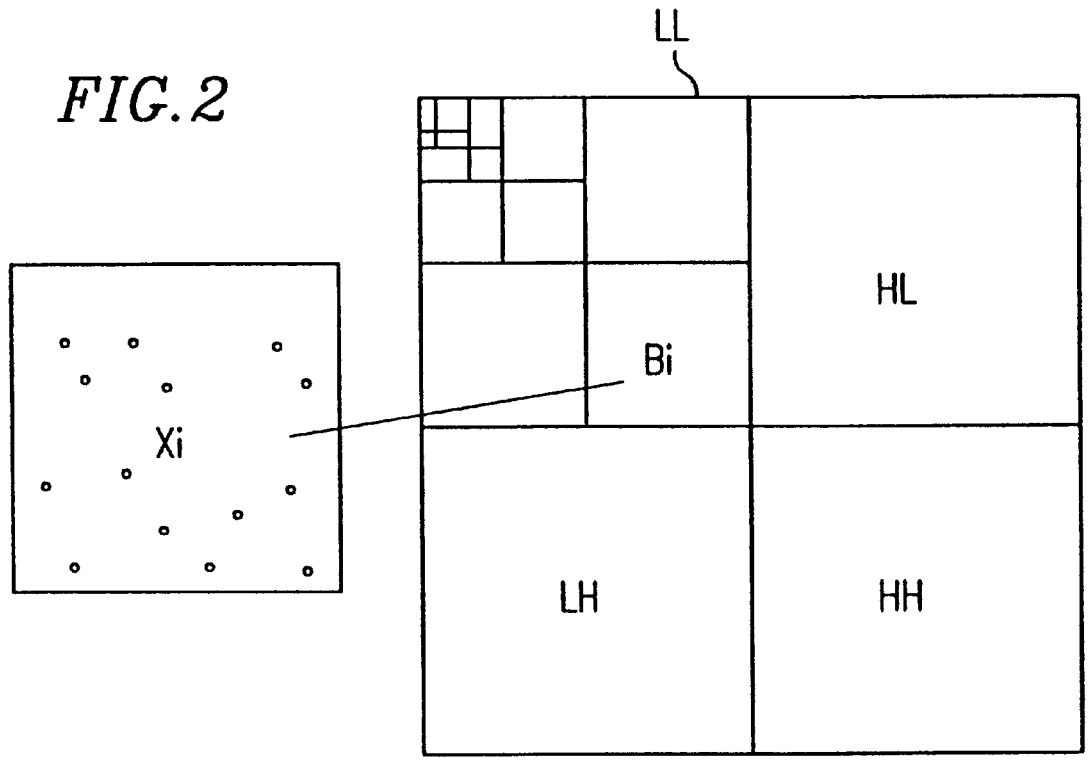
FIG. 2 is a diagram showing the data arrangement of transformed coefficients of an image which has been broken down into two-dimensional frequency components by wavelet transform.

FIG. 2 is a diagram showing the data arrangement of transformed coefficients of an image which has been broken down into two-dimensional frequency components by wavelet transform. By a first-level wavelet transform, transformed coefficients in regions (subbands) LL, LH, HL, and HH, in each of which the number of transformed coefficients is reduced to ½ along both the vertical and horizontal dimensions, are provided. For example, the subband LL consists of transformed coefficients which can be obtained by discarding every other pixel along both the vertical and horizontal dimensions. Therefore, restoring an image using the transformed coefficients from this subband results in an image having a ½ resolution of that of the original image. The subband LL consists of transformed coefficients which are derived from image components existing in the lower half of the frequency spectrum along both the vertical and horizontal dimensions. The subband HH consists of transformed coefficients which are derived from image components existing in the higher half of the frequency spectrum along both the vertical and horizontal dimensions. The subband HL consists of transformed coefficients which are derived from image components existing in the lower half along the vertical dimension, and in the higher half along the horizontal dimension, of the frequency spectrum. Similarly, the subband LH consists of transformed coefficients which are derived from image components existing in the higher half along the vertical dimension, and in the lower half along the horizontal dimension, of the frequency spectrum.

By further breaking down an image represented by the subband LL into higher and lower frequency components, subbands are obtained, each of which can be represented by a smaller number of transformed coefficients. Hereinafter, the transformed coefficients (frequency components) of a subband i will be denoted as $B_i$ (intermediate signal), where i is a natural number. It will be appreciated that the wavelet transform is similarly applicable to audio data as well.

The watermark data insertion section 2 shown in FIG. 1 includes a pseudo random number generation section 21, a multiplication section 22, a weighting/addition section 23, and a subtraction section 24.

The pseudo random number generation section 21 generates pseudo random numbers PN and outputs a signal $PN_{ij}$, which is weighted by the pseudo random numbers PN, by employing an internal audio or visual filter (not shown). The multiplication section 22 multiplies the output $B_i$ of the transform section 1 by the output $PN_{ij}$ of the pseudo random number generation section 21 so as to output a multiplication product $b_i = B_i \times PN_{ij}$.

The weighting/addition section 23 receives watermark data $WM_j$ (representing the actual watermark), which is converted into watermark data $W_j$ weighted by weighting coefficients corresponding to the respective subbands. The weighting/addition section 23 adds the watermark data $W_j$ and the output signal $b_i$ of the multiplication section 22 so as to output a signal $x_i = b_i + W_j$. The subtraction section 24 subtracts the output signal $b_i$ of the multiplication section 22 from the output $B_i$ of the transform section 1 so as to output the subtraction result $r_i$. The inverse transform section 3 includes an inverse wavelet transform section 31 for receiving the signals $x_i$ and $r_i$ and transforming these signals into an image signal with embedded watermark data, which is output from the inverse transform section 3.

The operation of the watermark data insertion apparatus having the above-described structure will be described in more detail. A digitalized image signal is transformed into signals $B_i$ of each subband i (where i is a natural number) by the wavelet transform section 11. The sensitivity of human eyes or ears becomes relatively high for the case where the signals $B_i$ of a subband represent the components of a middle frequency band, and relative low for the case where the signals $B_i$ of a subband represent the components of a low or high frequency band. The pseudo random number generation section 21 and the weighting/addition section 23 subject each subband to a weighting in accordance with such characteristics of the human visual or auditory sense.

The pseudo random number generation section generates pseudo random numbers PN consisting of 0 or 1. It will be appreciated that by employing these pseudo random numbers PN as they are, it would result in the multiplication section 22 selecting all the subbands in an impartial or uniform manner.

Rather, in order to prevent the unauthorized detection of the insertion position of the watermark data $WM_{ij}$, the uniform pseudo random numbers PN are converted into pseudo random numbers having the opposite characteristics of those of the human visual or auditory sense (frequency sensitivity), by being passed through a filter for cutting off the components of the middle frequency band, for example. The pseudo random number generation section 21 converts the pseudo random number PN into pseudo random numbers $PN_{ij}$ which are weighted by means of a frequency weighting filter (not shown). The use of such pseudo random numbers $PN_{ij}$ advantageously changes the random pattern from a white noise-like pattern into a pink noise-like pattern, which has less middle frequency components, hence making it difficult to detect.

The multiplication section 22 multiplies the signals $B_i$ of each subband by the predetermined pseudo random numbers $PN_{ij}$ to output a multiplication product signal $b_i$ (i.e., $b_i = B_i \times PN_{ij}$). Thus, at least one of the transformed coefficients of each subband that is multiplied by bit 1 of the pseudo random numbers $PN_{ij}$ is extracted so as to be output as the signal $b_i$.

Upon receiving the watermark data $WM_j$ (of binary values of 0 or 1), the weighting/addition section 23 converts each value of the watermark data $WM_j$ into either a positive predetermined value (when the value of the watermark data $WM_j$ is 1) or a negative predetermined value (when the value of the watermark data $WM_j$ is 0). Furthermore, the weighting/addition section 23 multiplies the transformed watermark data by a weight $K_{ij}$ corresponding to the subband from which the signals $b_i$ have been extracted so as to output the multiplication product as the watermark data $W_j$. One of respectively different values previously assigned to the respective subbands is used as the weight $K_{ij}$ for each subband i.

Specifically, the value of the weight $K_{ij}$ is decreased in the middle frequency band, where humans have high frequency sensitivity. That is, the values of the weight $K_{ij}$ are selected to realize the opposite characteristics of those of the human visual or auditory sense. As a result, even if the watermark data $W_j$ is inserted in a subband containing middle frequency band components, the watermark data $W_j$ is hardly visible (in the case of an image signal) and hardly audible (in the case of an audio signal).

By using the pseudo random numbers $PN_{ij}$ thus-weighted by the use of the frequency weighting filter and the weight $K_{ij}$ having values corresponding to the respective subbands, the watermark data $W_j$ will nonetheless be inserted in all subbands as a result of processing a series of image signals representing a plurality of pictures. Therefore, even if tampering is attempted by passing an image signal containing embedded watermark data through a low-pass filter or removing a portion of the signal, the watermark data will remain in the transformed coefficients in the middle and low frequency bands and therefore be detectable despite such tampering.

The weighting/addition section 23 adds the watermark data $W_j$ to the signal $b_i$ and outputs a signal $x_i$ (=$b_i+W_j$) containing embedded watermark data. The signal amplitude of the watermark data $W_j$ is selected to be smaller than that of the signal $b_i$ by increasing or decreasing the signal amplitude of the watermark data $W_j$ in such a manner that the watermark data is masked by the signal $b_i$ to prevent unauthorized detection.

The subtraction section 24 calculates a signal $r_i$ (=$B_i-b_i$) into which the watermark data was not inserted, and supplies the signal $r_i$ to the inverse transform section 3. The inverse transform section 3 synthesizes the signals $x_i$ and $r_i$ and performs a transform process at an inverse wavelet transform section 31 for restoring the original image signal. As a result of thus restoring the image, an image signal with embedded watermark data is obtained.

The inverse wavelet transform can be achieved by, interpolating 0 between sample signals of each subband, passing the interpolated sample signals through the same high-pass filter and low-pass filter that were used for the wavelet transform, and repetitively deriving a difference between each pair of a low frequency component and a high frequency component output from the high-pass filter and low-pass filter.

The above-described process is repeated for the same watermark data, whereby image signals representing images containing the same watermark data embedded therein are sequentially output. Alternatively, the addition of the same watermark data $W_j$ to the signal $b_i$ is performed multiple times so that a plurality of instances of watermark data are inserted in the signal $x_i$. In either case, a plurality of instances of the same watermark data will always be inserted into the image signal.

Figure 3:
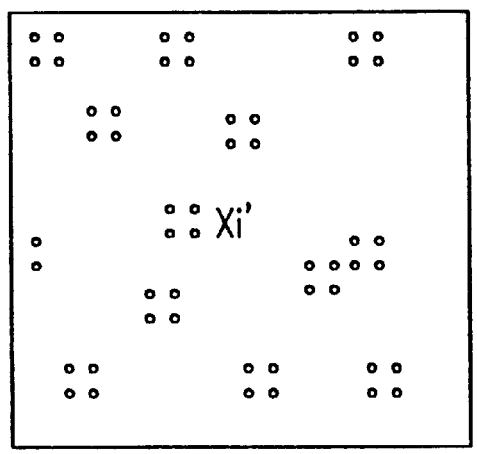
FIG. 3 is a diagram showing the position at which watermark data is embedded in an original signal coordinate system corresponding to the insertion of watermark data into a subband i in FIG. 2.

FIG. 3 is a diagram showing the position at which watermark data is embedded in an original signal coordinate system as restored by an inverse transform based on the simplest wavelet transform, assuming that the watermark data was embedded at a position $X_i$ among the transformed coefficients $B_i$ of a subband i (that lies in a region of high frequency components along both the horizontal direction and the vertical direction of the subband LL in FIG. 2). The signal amplitude of the watermark data is reduced to 1/16 due to the inverse transform, and its polarity (i.e., positive or negative) is also changed, so that the inverse-transformed pseudo random numbers do not take binary values but may take any real number between −1 and +1.

Figure 4:
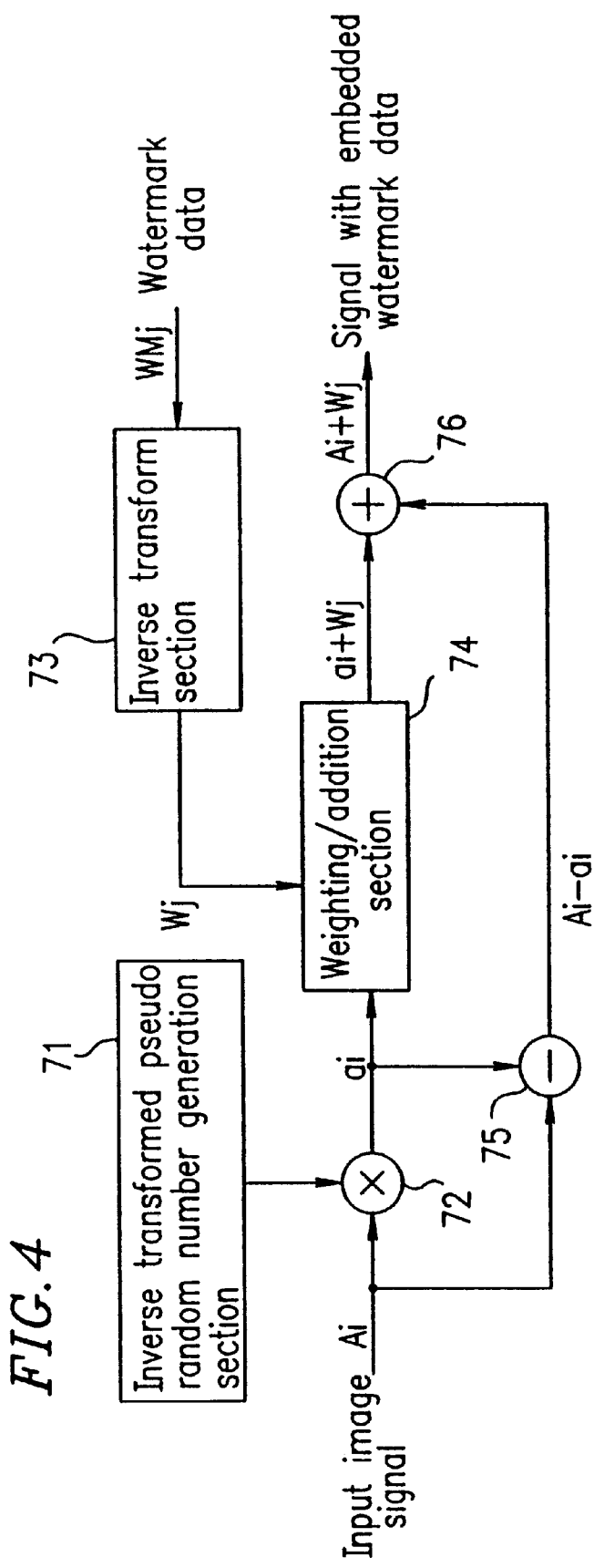
FIG. 4 is a block diagram illustrating the structure of a watermark data insertion apparatus as another embodiment of the watermark data insertion method according to the present invention.

FIG. 4 is a block diagram illustrating the structure of a watermark data insertion apparatus as another embodiment of the watermark data insertion method according to the present invention. As shown in FIG. 4, a multiplication section 72 directly multiplies an input image signal $A_i$ by inverse-transformed pseudo random numbers which are generated by an inverse-transformed pseudo random number generation section 71 so as to form a sample $a_i$ (i.e., a predetermined frequency component of an intermediate signal), which is output so that watermark data will be subsequently added thereto. Watermark data $WM_j$ is transformed into watermark data $W_j$ in a base band region by an inverse transform section 73, and the transformed watermark data $W_j$ is input to a weighting/addition section 74. The weighting/addition section 74 adds the transformed watermark data $W_j$ and the sample $a_i$ so as to output a signal $a_i+W_j$ containing embedded watermark data. A subtraction section 75 calculates a sample $A_i-a_i$ in which the watermark data is not embedded. An addition section 76 adds the output of the weighting/addition section 74 and the output of the subtraction section 75 so as to output an image signal containing embedded watermark data $A_i+W_j$.

In accordance with the above apparatus, an inverse transform of pseudo random numbers (indicating positions at which watermark data is to be inserted) based on an inverse wavelet transform, etc., is previously calculated. Thus, the inverse-transformed pseudo random numbers can be used to multiply an input image signal directly, i.e., without subjecting the image signal to a transform process. Moreover, it becomes unnecessary to perform an inverse transform after the addition of watermark data. As a result, the cost associated with the insertion of watermark data can be reduced.

Figure 5:
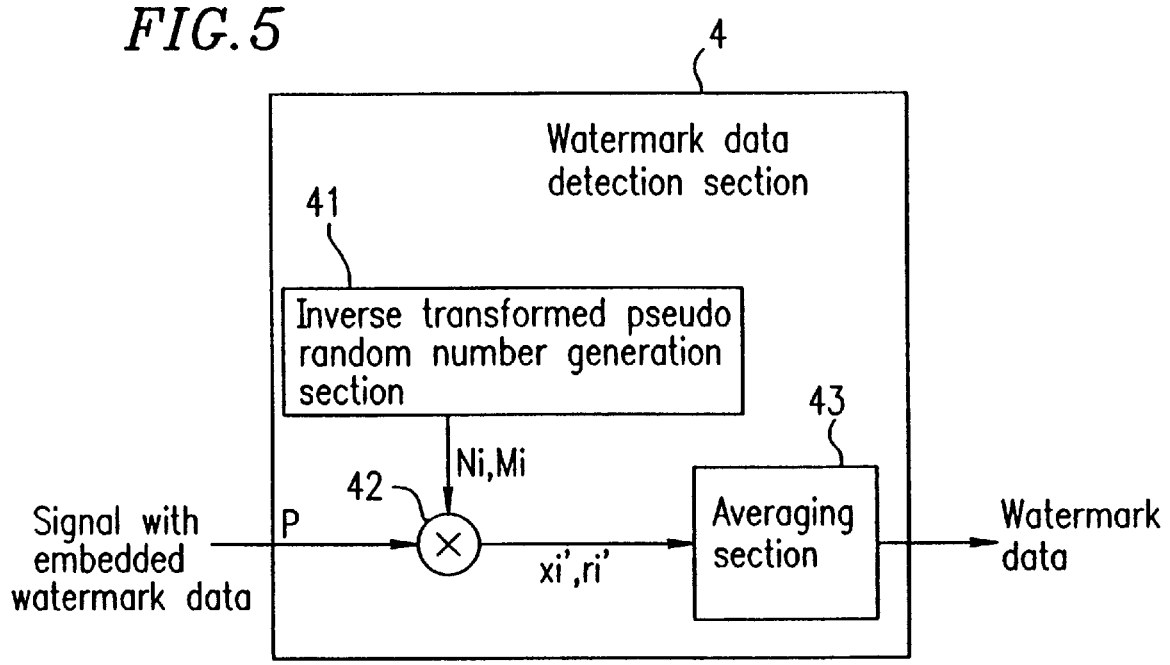
FIG. 5 is a block diagram illustrating the structure of a watermark data detection apparatus according to one embodiment of the watermark data detection method of the present invention.

Next, one embodiment of the watermark data detection method according to the present invention will be described. FIG. 5 is a block diagram illustrating the structure of a watermark data detection apparatus according to one embodiment of the watermark data detection method of the present invention. The watermark data detection apparatus includes a watermark data detection section 4, which in turn includes an inverse-transformed pseudo random number generation section 41, a multiplication section 42, and an averaging section 43.

The inverse-transformed pseudo random number generation section 41 includes a pseudo random number generation section, which is identical with that in the watermark data insertion apparatus shown in FIG. 1, for generating pseudo random numbers $PN_{ij}$ and $(1-PN_{ij})$ and inverse transforming the pseudo random numbers $PN_{ij}$ and $(1-PN_{ij})$ by inverse wavelet transform to generate and output inverse-transformed pseudo random numbers $PN_{ij}'$ and $(1-PN_{ij})'$. In FIG. 5, the inverse-transformed pseudo random numbers $PN_{ij}'$ and $(1-PN_{ij})'$ are shown as $N_i$ and $M_i$, respectively; $N_i$ is an inverse wavelet transform of the pseudo random numbers $PN_{ij}$ used for the determination of watermark data insertion position; and $M_i$ is an inverse wavelet transform of the complement of the pseudo random numbers $PN_{ij}$.

Upon receiving an image signal P containing embedded watermark data, the multiplication section 42 multiplies the image signal P by the inverse-transformed pseudo random numbers $N_i$ and $M_i$ to output a signal $x_i'$ ($=P \times PN_{ij}'$) and a signal $r_i'$ ($=P \times (1-PN_{ij})'$).

By using these inverse-transformed pseudo random numbers $N_i$ and $M_i$, it becomes unnecessary to subject image data containing watermark data to a wavelet transform in order to achieve detection of the watermark data. As a result, the time and cost required for detection are reduced.

The resultant signal $x_i'$ is a signal containing embedded watermark data. The resultant signal $r_i'$ is a signal not containing the watermark data embedded therein.

The signals $x_i'$ and $r_i'$ are input to an averaging section 43, where a cumulative sum $\Sigma x_i'$ and a cumulative sum $\Sigma r_i'$ are calculated for the signals $x_i'$ and $r_i'$, respectively. A difference therebetween ($\Sigma x_i' \times \Sigma r_i'$) is calculated.

The value of the above difference equals $x_i'-r_i'=(b_i'+WM_i')-r_i'$. Since the signals $b_i$ are generated by nondiscriminatory selection based on random numbers, an average of a multitude of $b_i'$ and an average of a multitude of $r_i'$ will satisfy $b_i'=r_i'$ (because the population of $b_i'$ and the population of $r_i'$ are identical). Thus, the above subtraction leaves $WM_j'$ ($=(b_i'+WM_j')-r_i'$), i.e., the watermark data. Based on the signs (i.e., positive or negative) of this value, the value of the watermark data $WM_j$ can be obtained.

When calculating an average of the signals $x_i'$ containing embedded watermark data, the average of higher frequency components receives a weight which is smaller than the weights for other average values. As a result, even if an unauthorized third party attempts to destroy or render undetectable the watermark data, or if the size or the position of the signal containing embedded watermark data is changed, or if noise is admixed in the high frequency components, such influences can be effectively eliminated.

Figure 6:
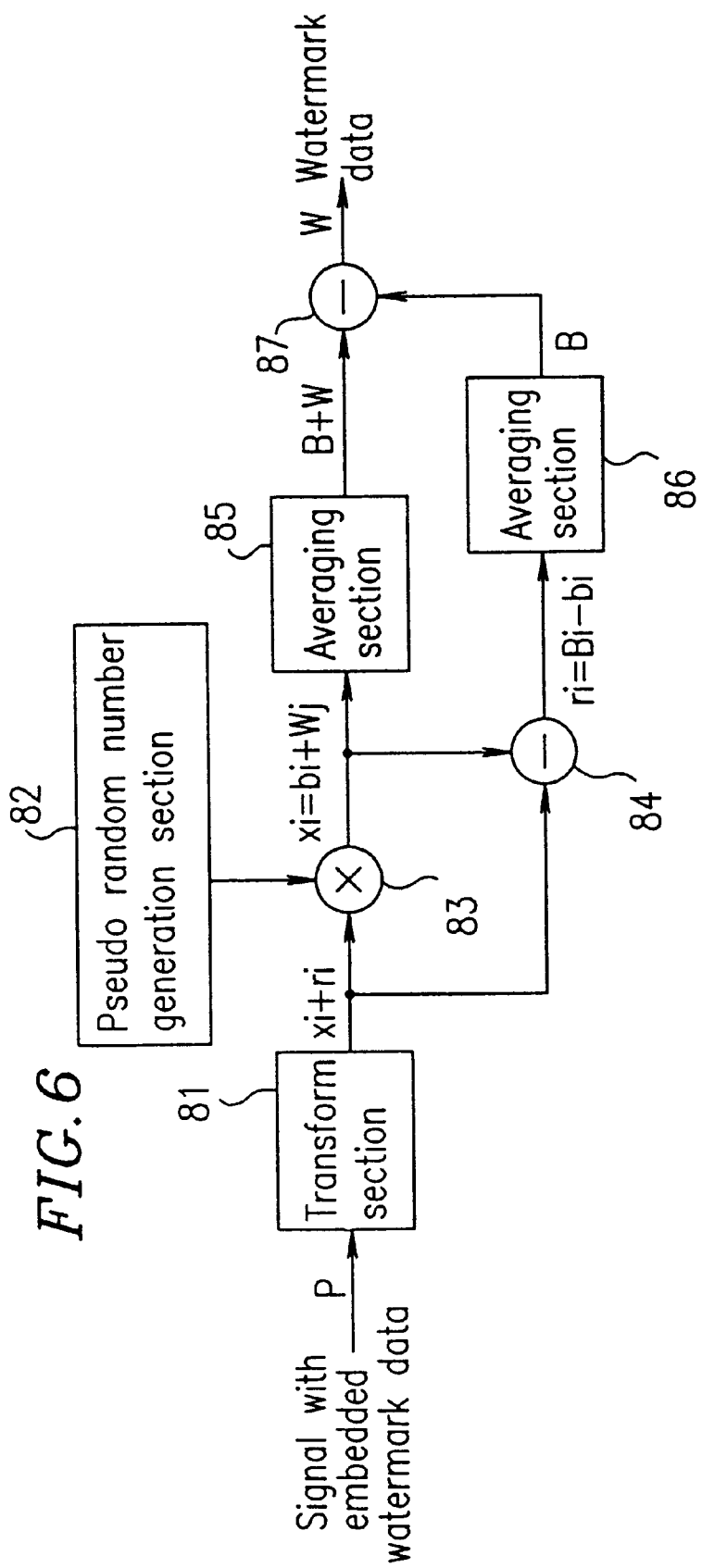
FIG. 6 is a block diagram illustrating the structure of a watermark data detection apparatus as another embodiment of the watermark data detection method according to the present invention.
Figure 7:
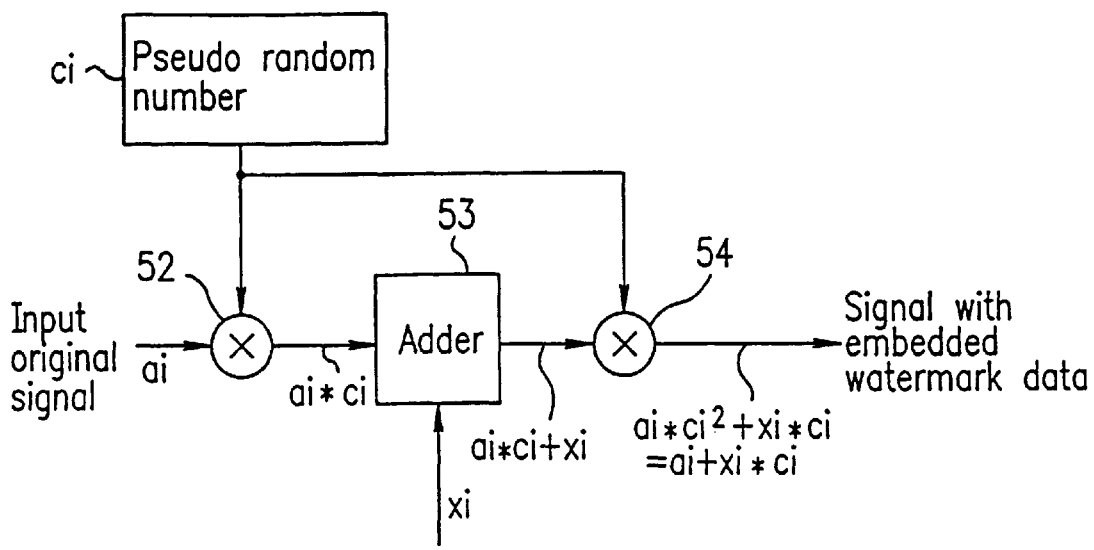
FIG. 7 is a block diagram illustrating the structure of a conventional watermark data insertion apparatus utilizing a spread spectrum technology.
Figure 8:
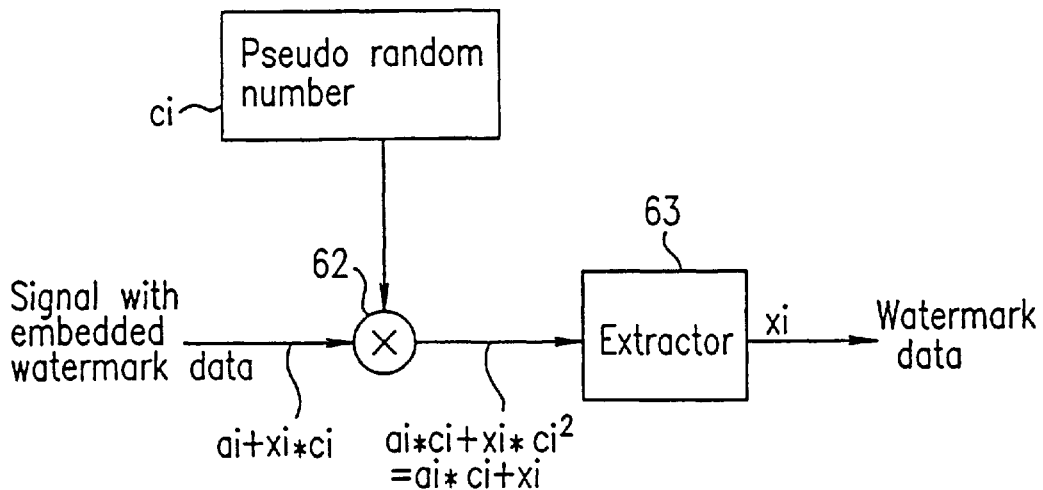
FIG. 8 is a block diagram illustrating the structure of a conventional watermark data detection apparatus utilizing a spread spectrum technology.

FIG. 6 is a block diagram illustrating the structure of a watermark data detection apparatus as another embodiment of the watermark data detection method according to the present invention. As shown in FIG. 6, a transform section 81 receives an image signal P containing embedded watermark data and performs a wavelet transform to transform the image signal P into transformed coefficients of each subband. This process is in the opposite direction with respect to the process performed by the inverse transform section 3 in FIG. 1. The signal (i.e., intermediate signal) which results from this process is equal to $x_i+r_i$ in the embodiment described with reference to FIG. 1. A multiplication section 83 multiplies the signal $x_i+r_i$ by pseudo random numbers generated by a pseudo random number generation section 82 (which are the same pseudo random numbers as those used in the embodiment described with reference to FIG. 1) so as to extract a signal $x_i$ containing embedded watermark data. The signal $x_i$ consists of the original signal $b_i$ with the watermark data $W_i$ added thereto. The averaging section 85 derives an average of a plurality of signals $x_i$ containing embedded watermark data to give a sum (B+W) of an average B of the original signals $b_i$ and an average W of the watermark data.

Only the signal $r_i$ ($=B_i-b_i$) in which the watermark data was not embedded is output from a subtraction section 84. An averaging section 86 derives an average of a plurality of signals $r_i$, thereby giving an average B of the original signals. A subtraction section 87 subtracts the average B from the average containing the watermark data (B+W), thereby obtaining the watermark data W.

Since the input signal is subjected to wavelet transform in the apparatus shown in FIG. 6, the same pseudo random numbers as those used in the above-described watermark data insertion apparatuses can be used.

Although a wavelet transform section is exemplified as a transform section in the above-illustrated embodiments, the same effects will be provided by employing a frequency transform means such as Hadamard transform, discrete cosine transform, Fourier transform, Karhunen-Loéve transform, or the like. Pseudo random numbers can be generated by using linear feedback shift registers. Alternatively, previously calculated pseudo random numbers can be stored in a memory or the like for use in the process of the present invention.

Various sections illustrated in the embodiments can be implemented as computer programs or dedicated digital circuits.

As described above, the watermark data insertion method and watermark data detection method according to the present invention make it possible to insert watermark data in a manner such that the watermark data is very difficult to detect by unauthorized third parties while being easily detectable by an authorized person, e.g., one who inserted the watermark data. Thus, the present invention makes possible the establishment of infringement of a copyright of copyrightable works and/or prevention of illegal copying of such works in the field of digital contents containing images and/or sounds.

In accordance with one embodiment of the present invention, a wavelet transform encompasses the pixel information of the entire single frame regardless of the subband that is being used. Therefore, watermark data can be easily embedded in the entire image through one watermark data insertion process. The method of the present invention also prevents block distortion, which is typically observed in DCT transform.

In accordance with one embodiment of the present invention, watermark data is inserted with its amplitude being adjusted in accordance with the luminance values of pixels, whereby the watermark data can be better concealed within the image.

In accordance with one embodiment of the present invention, watermark data can be inserted in positions in the pixel frequency space where the watermark data will not be easily noticeable.

In accordance with one embodiment of the present invention, the DC component of the watermarked data is not changed after insertion, thereby improving the signal to noise ratio in the averaging process during detection.

In accordance with one embodiment of the present invention, it is unnecessary to detect watermark data by referring to a reference image, thereby reducing the burden on the detection system.

In accordance with one embodiment of the present invention, watermark data can be detected even after processing a signal with a high-cut filter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A watermark data insertion method for inserting watermark data into an input original signal, comprising:
    a frequency transform step of applying a frequency transform to the original signal to form an intermediate signal;
    a watermark data insertion step of inserting the watermark data into a first set of frequency components of the intermediate signal; and
    a frequency inverse transform step of applying an inverse frequency transform to the intermediate signal, the watermark data having been inserted into the intermediate signal, thereby obtaining a signal containing the watermark data embedded therein,
    wherein the watermark data insertion step comprises:
        determining, based on pseudo random numbers, the first set of frequency components of the intermediate signal into which the watermark data is inserted; and
        using a second set of frequency components of the intermediate signal as a reference signal, the watermark data not being inserted into the second set of frequency components.

2. A watermark data insertion method according to claim 1, wherein the frequency transform applied in the frequency transform step is a wavelet transform, and the inverse frequency transform applied in the frequency inverse transform step is an inverse wavelet transform.

3. A watermark data insertion method according to claim 1, wherein the watermark data insertion step comprises:
    a weighting step of increasing or decreasing a signal amplitude of the watermark data in accordance with an amplitude of the first set of frequency components of the intermediate signal into which the watermark data is inserted.

4. A watermark data insertion method according to claim 1, wherein the watermark data insertion step comprises determining the first set of frequency components of the intermediate signal into which the watermark data is inserted by using pseudo random numbers having frequency-dependent weights.

5. A watermark data insertion method according to claim 1, wherein the watermark data insertion step comprises:
    a weighting step of increasing or decreasing a signal amplitude of the watermark data in accordance with a frequency of the first set of frequency components of the intermediate signal into which the watermark data is inserted.

6. A watermark data insertion method according to claim 1, wherein the watermark data insertion step comprises converting binary data representing the watermark data into predetermined positive and negative values, and thereafter inserting the converted binary data into the first set of frequency components of the intermediate signal.

7. A watermark data insertion apparatus for inserting watermark data into an input original signal, comprising:
    a frequency transform section for applying a frequency transform to the original signal to form an intermediate signal;
    a watermark data insertion section for inserting the watermark data into a first set of frequency components of the intermediate signal; and
    a frequency inverse transform section for applying an inverse frequency transform to the intermediate signal, the watermark data having been inserted into the intermediate signal, thereby obtaining a signal containing the watermark data embedded therein,
    wherein the watermark data insertion section determines the first set of frequency components of the intermediate signal into which the watermark data is inserted based on pseudo random numbers, and uses a second set of frequency components of the intermediate signal as a reference signal, the watermark data not being inserted into the second set of frequency components.

* * * * *